(12) United States Patent
Senoski

(10) Patent No.: US 8,712,900 B2
(45) Date of Patent: Apr. 29, 2014

(54) GENERATING A FUNDING AND INVESTMENT STRATEGY ASSOCIATED WITH AN UNDERFUNDED PENSION PLAN

(71) Applicant: FMR LLC, Boston, MA (US)

(72) Inventor: Michael Senoski, Medfield, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 13/774,987

(22) Filed: Feb. 22, 2013

(65) Prior Publication Data

US 2013/0226836 A1 Aug. 29, 2013

Related U.S. Application Data

(60) Provisional application No. 61/603,048, filed on Feb. 24, 2012.

(51) Int. Cl.
  *G06Q 40/00* (2012.01)
(52) U.S. Cl.
  USPC .......................................................... 705/36
(58) Field of Classification Search
  USPC ..................................................... 705/35–45
  See application file for complete search history.

(56) References Cited

U.S. PATENT DOCUMENTS

| | | | |
|---|---|---|---|
| 4,969,094 A | 11/1990 | Halley et al. | |
| 8,131,613 B2 | 3/2012 | Tan-Torres, Jr. | |
| 8,335,699 B2 * | 12/2012 | Elshaw et al. | 705/4 |
| 2007/0162365 A1 * | 7/2007 | Weinreb | 705/35 |
| 2007/0226111 A1 * | 9/2007 | Tan-Torres | 705/36 R |
| 2007/0239579 A1 | 10/2007 | Gulotta et al. | |
| 2010/0121785 A1 | 5/2010 | Lyons et al. | |
| 2010/0280969 A1 | 11/2010 | Ryan | |
| 2011/0029452 A1 | 2/2011 | Carcano | |

OTHER PUBLICATIONS

Michael Rausch & Andrew Wozniak, "Issuing Debt to Fund Corporate Pension Plans", Mar. 2010, pp. 1-2.*
Bader et al., "Reinventing Pension Actuarial Science," The Pension Forum, 34 pages.
Labrosse et al., "Borrowing to Fund Pension Debt," Mercer—Global Retirement Perspective, Apr. 5, 2011, 2 pages. http://www.mercer.com/articles/Borrowing_to_fund_pension_debt.
"Commentary—Liability Driven Investment Strategies," Buffin Partners, Inc., Economic Investment and Actuarial Research, Aug. 2005, 1 page.
Rausch et al., "Viewpoint—Issuing Debt to Fund Corporate Pension Plans," BNY Mellon Asset Management, Mar. 2010, 2 pages.

(Continued)

*Primary Examiner* — Chia Yi Liu
(74) *Attorney, Agent, or Firm* — Proskauer Rose LLP

(57) ABSTRACT

Methods and apparatuses are described generating a funding and investment strategy associated with an underfunded pension plan. A computing device determines an amount of funding required to fund the pension plan to a predetermined liability limit, where the amount of funding required is adjusted for (i) an expected return on pension plan assets, (ii) governmental premiums imposed on underfunded pension plans, and (iii) tax deduction amounts. The computing device determines an amount of debt to incur based on the amount of funding required, and contributes the incurred debt amount into the pension plan as a pension plan asset. The computing device generates a strategic plan for investing the contributed pension plan asset in long-duration bonds, where the long-duration bonds have a higher yield curve than the incurred debt interest rate. The computing device acquires long-duration bonds that have characteristics consistent with the strategic plan.

24 Claims, 9 Drawing Sheets

(56) References Cited

OTHER PUBLICATIONS

Westerheide et al., "Liability Driven Investing—Adding Investment Return, Lowering Risk," Financial Executive, Jan./Feb. 2008, 3 pages.

Williamson, "Liability-driven investment's growth side to hit the limelight," Pensions & Investments, Apr. 18, 2011, 3 pages.

Moloney, "Perspective—Managing an unwanted risk for defined benefit pension funds," Mercer Human Resource Consulting, 9 pages.

"Managing Your Defined Benefit Plan in Today's Investment Environment," Pentegra Retirement Services, 3 pages.

\* cited by examiner

5 Year Level Funding Based on Glidepath
(dollar amounts in millions)

| | | Annual Pension Contribution | | | | | |
|---|---|---|---|---|---|---|---|
| Year | Deficit | Amortization | Interest | Rate | Total | Taxes | Net CF |
| 0 | $847 | | | | | | |
| 1 | $645 | $202 | -$41 | -4.8% | $161 | -$56 | $105 |
| 2 | $479 | $167 | -$6 | -0.9% | $161 | -$56 | $105 |
| 3 | $315 | $164 | -$2 | -0.5% | $161 | -$56 | $105 |
| 4 | $155 | $160 | $1 | 0.5% | $161 | -$56 | $105 |
| 5 | $0 | $155 | $6 | 3.8% | $161 | -$56 | $105 |
| Total | | $847 | -$41 | | $806 | -$282 | $524 |

310

Borrow To Fund Alternative to 5 Year Level Funding Based on Glidepath, Borrow $472, Fund $725
$725 Invested in LDI

| | | Debt Service | | | | | | After Tax |
|---|---|---|---|---|---|---|---|---|
| Year | Debt | Principal | Interest | Rate | Total | Taxes | Net CF | Rate |
| 0 | $472 | | | | | | | |
| 1 | $384 | $87 | $6 | 1.3% | $93 | -$2 | $91 | 0.8% |
| 2 | $294 | $91 | $5 | 1.3% | $96 | -$2 | $94 | 0.8% |
| 3 | $199 | $95 | $4 | 1.3% | $98 | -$1 | $97 | 0.8% |
| 4 | $101 | $98 | $3 | 1.3% | $101 | -$1 | $100 | 0.8% |
| 5 | $0 | $101 | $1 | 1.3% | $102 | $0 | $102 | 0.8% |
| Total | | $472 | $19 | | $490 | -$7 | $484 | |

GENERATING A FUNDING AND INVESTMENT STRATEGY ASSOCIATED WITH AN UNDERFUNDED PENSION PLAN

RELATED APPLICATIONS

This application claims priority to U.S. Provisional Patent Application No. 61/603,048, filed on Feb. 24, 2012.

FIELD OF THE INVENTION

This application relates generally to methods and apparatuses, including computer program products, for generating a funding and investment strategy associated with an underfunded pension plan.

BACKGROUND

Pension plans, such as defined benefit plans, can be costly to a sponsoring company due to the funding obligations and also affect the perceived health of the company's balance sheet. Pension plans are often seen as a liability, and by having them, a certain amount of risk is inherent.

For example, funding shortfalls are problematic. Legislation exists to anticipate and remedy them, and insurance companies exist to cover a company's liability should the company underfund the pension plan. An estimate of the aggregate pension funding shortfall of the S&P 1500 at year-end 2011 was $484 billion (representing a 75% funding level), up a staggering $544 billion from year-end of 2007 when the aggregate funding level was 104%. By putting downward pressure on pension liability discount rates, the current low interest rate environment has been a major contributing factor to this increase in unfunded pension liabilities. Treasury yields, a major component of pension liability discount rates, ended 2011 at near record lows and the interest rate of the Citigroup Pension Liability Index ended 2011 at a record low 4.40%.

Recent survey data suggest that many plans may be trending dangerously close to the critical 80% funding level threshold under the Pension Protection Act ("PPA"). Plan sponsors who find themselves in this position might want to consider making additional contributions to their plans in order to avoid the penalties that could result if they fall below this level. These penalties include a restriction on lump sum distributions to no more than 50% of the value of the participant's accrued benefit (lump sum distributions are prohibited if a plan's funding level falls below 60%); possible designation of a plan as "At Risk" if its funding level is also less than 70% based on more conservative "worst-case scenario" assumptions—contribution requirements are higher for "At Risk" plans; and/or additional disclosure and filing requirements, including (1) a notice to participants in the event lump sum distributions are restricted and (2) a "4010 filing" of financial and actuarial information when the funding level falls below 80%.

SUMMARY OF THE INVENTION

What is needed is a way to determine if a company should continue to maintain a defined benefit plan and if so, options to sufficiently fund it. Provided herein are methods and systems of analyzing financial strategies for end-stage defined benefit plans, and determining the most cost effective option for either terminating a plan or keeping it as a liability. At a high level, the techniques described herein analyze various factors, e.g., Cash Flow and Pension Expenses, over a period of time, and then determine an appropriate, cost-effective strategy for a plan sponsor.

The invention, in one aspect, features a computerized method for generating a funding and investment strategy associated with an underfunded pension plan. A computing device determines an amount of funding required to fund the pension plan to a predetermined liability limit, where the amount of funding required is adjusted for (i) an expected return on pension plan assets, (ii) governmental premiums imposed on underfunded pension plans, and (iii) tax deduction amounts. The computing device determines an amount of debt to incur based on the amount of funding required, and contributes the incurred debt amount into the pension plan as a pension plan asset. The computing device generates a strategic plan for investing the contributed pension plan asset in long-duration bonds, where the long-duration bonds have a higher yield curve than the incurred debt interest rate. The computing device acquires long-duration bonds that have characteristics consistent with the strategic plan.

The invention, in another aspect, features a system for generating a funding and investment strategy associated with an underfunded pension plan. The system includes a computing device with a processor configured to determine an amount of funding required to fund the pension plan to a predetermined liability limit, where the amount of funding required is adjusted for (i) an expected return on pension plan assets, (ii) governmental premiums imposed on underfunded pension plans, and (iii) tax deduction amounts. The processor is configured to determine an amount of debt to incur based on the amount of funding required and contribute the incurred debt amount into the pension plan as a pension plan asset. The processor is configured to generate a strategic plan for investing the contributed pension plan asset in long-duration bonds, where the long-duration bonds have a higher yield curve than the incurred debt interest rate. The processor is configured to acquire long-duration bonds that have characteristics consistent with the strategic plan.

The invention, in another aspect, features computer program product, tangibly embodied in a non-transitory computer readable storage medium, for generating a funding and investment strategy associated with an underfunded pension plan. The computer program product includes instructions operable to cause a computing device to determine an amount of funding required to fund the pension plan to a predetermined liability limit, where the amount of funding required is adjusted for (i) an expected return on pension plan assets, (ii) governmental premiums imposed on underfunded pension plans, and (iii) tax deduction amounts. The computer program product includes instructions operable to cause the computing device to determine an amount of debt to incur based on the amount of funding required and contribute the incurred debt amount into the pension plan as a pension plan asset. The computer program product includes instructions operable to cause the computing device to generate a strategic plan for investing the contributed pension plan asset in long-duration bonds, where the long-duration bonds have a higher yield curve than the incurred debt interest rate. The computer program product includes instructions operable to cause the computing device to acquire long-duration bonds that have characteristics consistent with the strategic plan.

The invention, in another aspect, features a system for generating a funding and investment strategy associated with an underfunded pension plan. The system includes means for determining an amount of funding required to fund the pension plan to a predetermined liability limit, where the amount of funding required is adjusted for (i) an expected return on pension plan assets, (ii) governmental premiums imposed on underfunded pension plans, and (iii) tax deduction amounts. The system includes means for determining an amount of debt to incur based on the amount of funding required and means for contributing the incurred debt amount into the pension plan as a pension plan asset. The system includes means for generating a strategic plan for investing the contributed pension plan asset in long-duration bonds, where the long-duration bonds have a higher yield curve than the incurred debt interest rate. The system includes means for acquiring long-duration bonds that have characteristics consistent with the strategic plan.

In some embodiments, any of the above aspects can include one or more of the following features. In some embodiments, the computing device determines a schedule of future contribution amounts for the pension plan based on the strategy for investing and adjusts the amount of debt to incur based on the schedule of future contribution amounts. In some embodiments, the computing device determines a tax savings amount based on the incurred debt interest rate and adjusts the amount of debt to incur based on the tax savings amount. In some embodiments, the tax savings amount is based on a tax deduction on interest accrued under the incurred debt interest rate. In some embodiments, the tax savings amount is based on an investment return earned on the contributed pension plan asset.

In some embodiments, the duration of the long-duration bonds is equal to a government-imposed funding period. In some embodiments, the governmental premiums imposed on underfunded pension plans include Pension Benefit Guaranty Corporation (PBGC) premiums. In some embodiments, the long-duration bonds have a higher interest rate than the incurred debt interest rate.

In some embodiments, the characteristics consistent with the strategic plan include an interest rate and a duration. In some embodiments, the incurred debt is in the form of a corporate debt offering.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is an exemplary illustration for a pension plan funding and investment strategy based on the techniques described herein.

FIG. 7 is an exemplary plan termination illustration.

DETAILED DESCRIPTION

With unfunded pension liabilities near record levels, there are compelling reasons for plan sponsors to consider making additional discretionary contributions to their plans. Using corporate debt to finance a discretionary pension contribution reduces balance sheet volatility and increases the predictability of operating cash flows. In some embodiments, in addition to or as an alternative to funding using corporate debt, there are several potential sources of financing a plan contribution such as cash and other liquid securities; proceeds from newly issued debt; proceeds from a stock offering; and/or Treasury stock.

Figure 1:
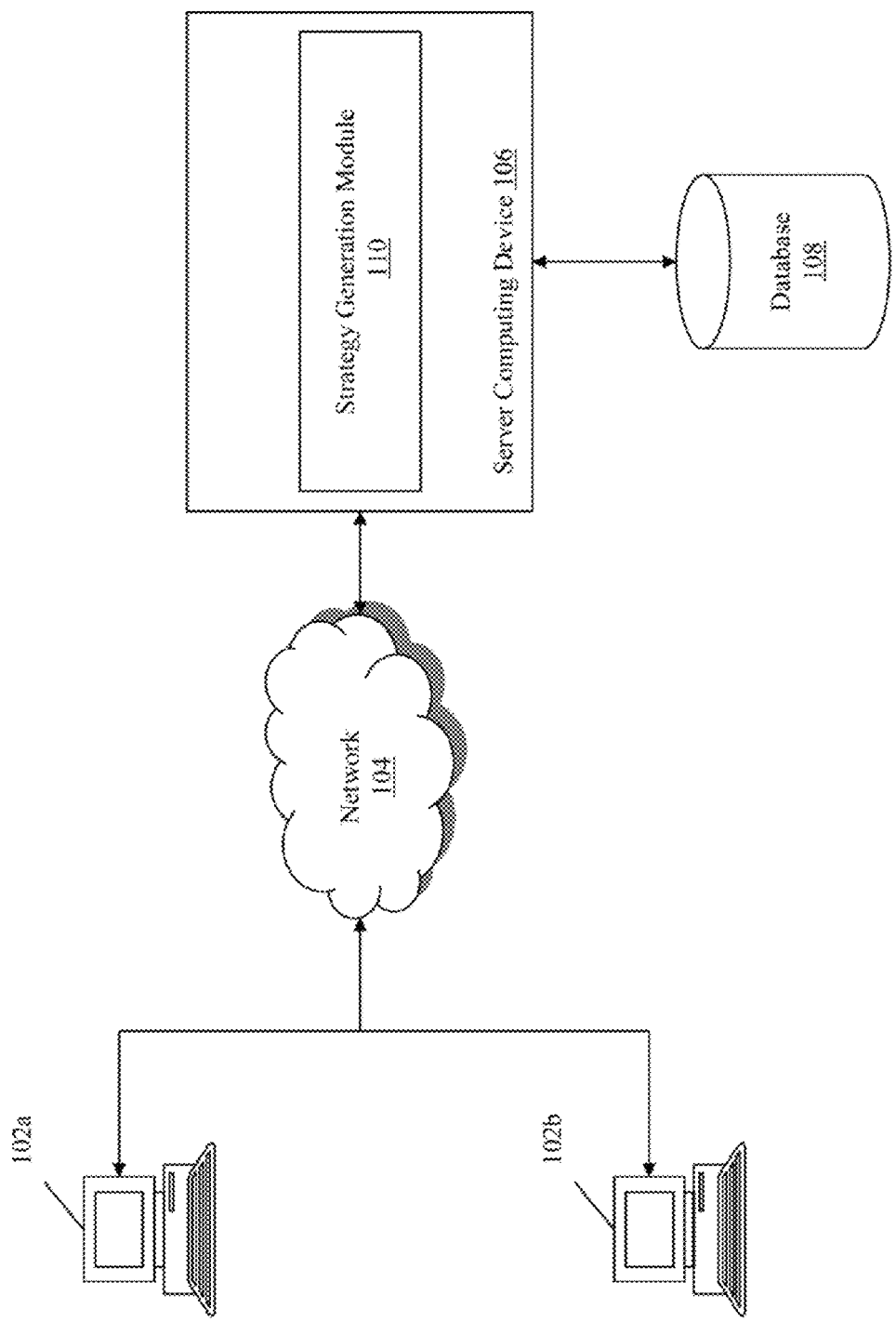
FIG. 1 is a block diagram of a system for generating a funding and investment strategy associated with an underfunded pension plan.

FIG. 1 is a block diagram of a system 100 for generating a funding and investment strategy associated with an underfunded pension plan. The system 100 includes client computing devices 102a-102b, communications network 104, server computing device 106, and database 108. The computing devices implement the computer processing in accordance with computer-implemented embodiments of the invention. The methods described herein may be achieved by implementing program procedures, modules and/or software executed on, for example, a processor-based computing devices or network of computing devices.

The client computing devices 102a-102b enable a user to connect to the server computing device 106 via the network 104 and access services provided by the server 106. Exemplary computing devices take on many forms, including but not limited to a personal computer, a tablet computer, a smart phone, an internet appliance, or the like. The client computing devices 102a-102b include network-interface components to enable the user to connect to a communications network 104, such as the Internet. The computing devices 102a-102b also include software (e.g., a web browsing application) to enable the user to navigate to an address associated with the server 106, view content received from the server 106, and provide input that is transmitted to the server 106.

The communications network 104 sends communications from the client computing devices 102a-102b to the server computing device 106 and back. The network 104 may be a local network, such as a LAN, or a wide area network, such as the Internet or the World Wide Web.

The server computing device 106 includes a strategy generation module 110. The strategy generation module 110 is a hardware and/or software module located in the server computing device 106 and used to execute the method for generating a funding and investment strategy associated with an underfunded pension plan. In some embodiments, the server computing device 106 is coupled to other computing devices (not shown). In some embodiments, the functionality of the strategy generation module 110 is distributed among a plurality of computing devices. Additionally, in some embodiments, the database 112 is internally integrated into the server computing device 106. It should be appreciated that any number of computing devices, arranged in a variety of architectures, resources, and configurations (e.g., cluster computing, virtual computing, cloud computing) can be used without departing from the scope of the invention.

A user at a client computing device (e.g., device 102a) can interact with the system 100 by opening a Web browser on the client device 102a and entering the address of the server 106. The user can log in to the server 106 by providing credentials to the Web browser. The credentials can include, for example, one or more of the following: a username, user ID, password, personal identification number (PIN), certificate, pass code, encryption key, or other similar authentication data. For example, the server 106 receives a request from the client device 102a to access an application associated with strategy generation module 110, where the request contains the credentials. The server 106 authenticates the user by comparing the credentials in the request with pre-stored credential information. Once the server 106 authenticates the user, the server 106 enables the user to access the strategy generation module 110. The strategy generation module 110 can be an element of a web-based application, implemented using HTML, XML, JavaScript, or other similar software development platforms, that receives inputs from the client device 102a and processes the inputs in a fully automated manner to generate a funding and investment strategy for an underfunded pension plan, according to the methods described herein. The strategy generation module 110 also generates user interface data as part of the funding and investment strategy generation, and transmits a user interface based on the user interface data to the client device 102a for display to the user.

Figure 2:
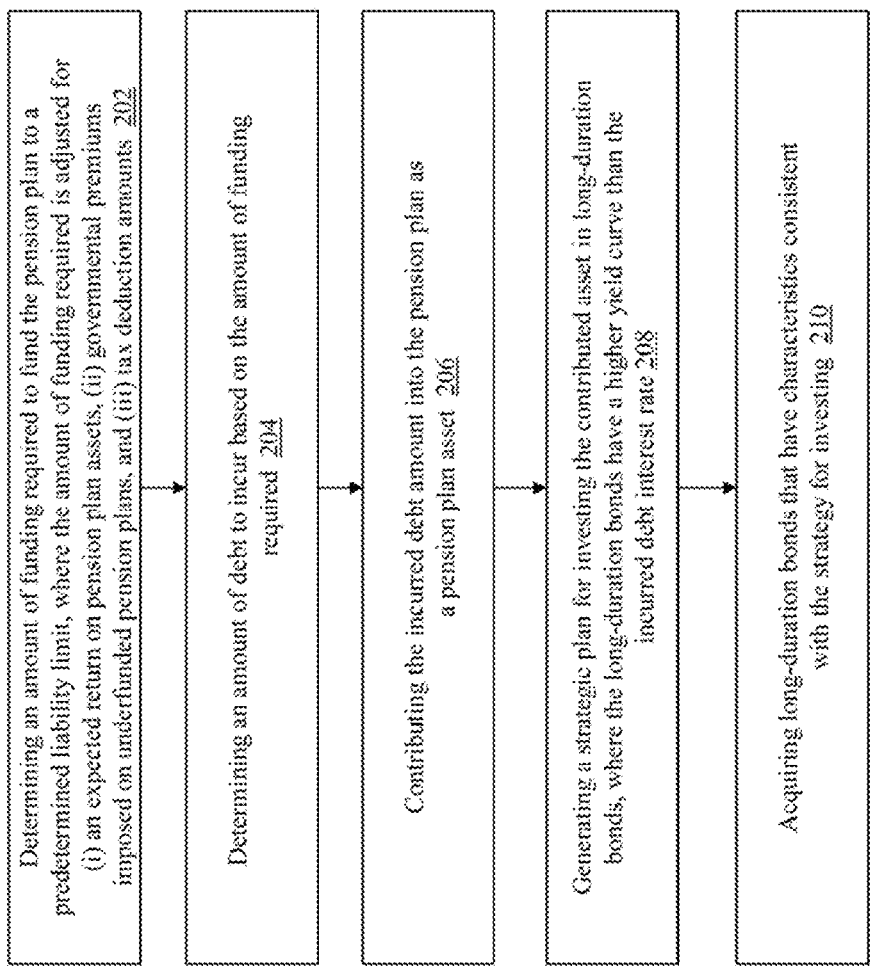
FIG. 2 is a flow diagram of a method for generating a funding and investment strategy associated with an underfunded pension plan.

FIG. 2 is a flow diagram of a method 200 for generating a funding and investment strategy associated with an underfunded pension plan. The server computing device 106 determines (202) an amount of funding required to fund the pension plan to a predetermined liability limit, where the amount of funding required is adjusted for (i) an expected return on pension plan assets, (ii) governmental premiums imposed on underfunded pension plans, and (iii) tax deduction amounts.

In one embodiment, the server 106 receives information associated with the pension plan, e.g., from a database 112 coupled to the server 106 or via input provided by a user at the client device 102a. The server 106 evaluates the received information to determine how underfunded the pension plan is and how much money is required to restore the pension plan to a predetermined liability limit.

For example, the server 106 determines the amount of funding required based on the pension plan's current assets (i.e., the money held in the plan and the cash contributions that are made to the plan) and the pension plan's liabilities. The plan's liabilities can include the benefits earned by the plan participants in the current year (i.e., normal cost) and the expected future pension payments for each participant in the plan. The future payments are discounted from the date of payment to the current date using actuarial assumptions, such as the discount interest rate, expected inflation rate, long-term rate of return on assets, demographics of the pension plan participants, and the like.

For example, in one embodiment, the determination of the plan sponsor's annual pension cost includes a credit for the "expected return on plan assets," determined by multiplying the "expected long-term rate of return on plan assets" by the value of plan assets. Apart from the impact of a contribution on a plan's asset allocation and expected rate of return, in some instances the result of an additional plan contribution is a proportionate increase in the amount of this credit and a corresponding decrease in pension cost. And in some cases, over the long term, any difference between actual and expected investment returns flows through the plan sponsor's income statement on a deferred recognition basis.

Based on these determinations, the server 106 provides an amount in present dollars that, if contributed to the plan, would fund the pension plan to the predetermined liability limit (e.g., >80%).

Plan sponsors typically alter their view of the risk/reward tradeoff between return-seeking and liability hedging assets in favor of a greater allocation to the latter as a plan's funding level increases. A growing number of plans have implemented a "glidepath" that specifies decreases in return seeking assets in favor of liability hedging assets as plan funding levels rise to targeted levels. This makes sense because the plan's rate of return required to close the plan's funding shortfall and the marginal utility of excess returns decline (and the potential for stranded surplus grows) as a plan's funding level improves, particularly for frozen plans. In other words, the techniques described herein show that the improvement in a plan's funding level represents a potential opportunity for the plan sponsor to reduce the risks to plan participants and shareholders represented by return seeking assets on a favorable basis.

It is typical among credit analysts and rating agencies for some recognition of pension liabilities in the credit evaluation process. However, relative to the treatment of corporate debt in the credit rating process, the treatment of pension liabilities is not as consistent. Some treat unfunded pension liabilities as the equivalent of corporate debt, with similar explicit recognition in the rating process. In other cases, the treatment of unfunded pension liabilities is more qualitative in nature. For example, unfunded pension liabilities may receive greater consideration in a case where a relatively small increase in debt ratios could result in a lower credit rating. Thus it is beneficial that the techniques described herein analyze the defined benefit pension plan and determines if and how it should be funded using debt. In some instances though, apart from relative cost, the potential use of debt to finance a plan contribution may raise other issues to consider, such as capital structure, capital budgeting, funding flexibility, debt capacity, and loan covenants that should be vetted with the plan sponsor's financial advisors.

The server 106 determines (204) an amount of debt to incur based on the amount of funding required. The server 106 evaluates the amount of funding required, as determined in the previous step 202, and determines how much debt corresponds to the required funding amount. Typically, the most attractive funding option can be in the form of a corporate debt offering from the sponsor of the pension plan due to the historic lows in interest rates experienced by the current economic market. Because pension contributions are tax deductible, the amount of debt required to finance the transaction will roughly be 65% of the contribution to the plan. For example, if the amount of funding required (in present dollars) is $18M, the server 106 determines that debt in the amount of $11.7M should be incurred. Beneficially, when the proceeds of the offering are used to fund a plan contribution, this transaction bears similarities to a debt swap since the increase in corporate debt on the balance sheet is offset by a decrease in pension.

Also, in some cases, the interest on a corporate debt offering is tax deductible—further reducing the expected interest costs. At the same time, the investment return earned on the contribution once invested inside the plan is tax free.

For example, the U.S. Government provides insurance against underfunded defined benefits plan by way of the Pension Benefit Guaranty Corporation (PBGC). PBGC is a federal agency created by the Employee Retirement Income Security Act of 1974 (ERISA) to protect pension benefits in private-sector defined benefit plans. Annual PBGC premiums typically include a variable component currently set at $9/$1000 of unfunded liability. Apart from actual investment performance, contributions to the pension plan thus deliver a risk free after-tax return of nine basis points, a figure which may increase if a proposal to increase PBGC is enacted by Congress.

A further benefit of the techniques described herein relating to analyzing the defined benefit plan and determining how it should be funded, is from a financial accounting perspective, a plan contribution that is financed by debt exchanges the resulting decrease in unfunded pension liability that is on the balance sheet for corporate debt (the economic impact of the transaction is best viewed from the perspective of an expanded balance sheet, where the increase in corporate debt is offset by an increase in plan assets). Because both pension assets and liabilities are measured on a "market value" basis, unfunded pension liabilities on the plan sponsor's balance sheet typically exhibit a high degree of volatility. In some implementations, replacing volatile unfunded pension liabilities with more predictable debt that is valued on an amortized cost basis reduces balance sheet volatility and stabilizes critical financial ratios. And, because volatile unfunded pension liabilities also translate into potentially volatile pension funding costs that complicate cash flow management and capital budgeting predictability, replacing unfunded pension liabilities with debt may help to stabilize cash flow and simplify the planning and budgeting process.

The server 106 contributes (206) the incurred debt amount into the pension plan as a pension plan asset. Once the amount of debt is determined and the debt proceeds are received, the server 106 deposits the debt amount into the pension plan as an asset—thereby increasing the present value of the pension plan to satisfy the predetermined liability limit, based on the investment strategy to be discussed below.

The server 106 generates (208) a strategy for investing the contributed asset in long-duration bonds, where the long-duration bonds have a higher yield curve than the incurred debt interest rate. In some embodiments, certain assumptions can be utilized to analyze the defined benefit plan. For example, assuming the contributions were invested in long duration bonds to match the profile of pension liabilities, arguably another potential advantage and cost saving may result from what might be termed "yield curve arbitrage." For example, apart from credit quality and other factors, the rate of interest on a seven-year note issued to finance a contribution (seven years is funding period for pension deficits under the PPA) will generally be lower than the longer term rates of interest due to the steepness of the yield curve. Typically though, actual savings depend upon subsequent movements in interest rates and yield curves.

The investment strategy described herein offers several advantages. First, investing in long-duration bonds results in locked-in savings because the interest rate on the incurred corporate debt—combined with the tax advantages described above—is lower than the long-term interest rates on the bonds. As a result, this approach is preferable to investing the contributed plan asset in equities, which have traditionally been subject to greater risk of decrease in value and a lack of guaranteed return. Second, the pension plan sponsor is still required to make contributions to fund the plan above statutory minimums, so the techniques provide the advantage of contribution flexibility, that is, the ability to pre-fund future contributions as debt now (to satisfy future years' minimums) and lock in a preferred interest rate.

In addition, the techniques provide for the flexibility to adjust future contribution amounts in the event of shortfalls or surplus. Because at least a portion of future years contributions are being contributed now, the pension plan sponsor can, in the future, increase additional contributions in the event of a shortfall or decrease additional contributions in the event of a surplus. Because the costs associated with a surplus are significant (e.g., 50% tax on reversion and imposition of a regular corporate income tax), the techniques described herein allow for flexibility in getting as close to the required plan funding amount without going over (and thus being subject to surplus penalties).

The server 106 acquires (210) long-duration bonds that have characteristics consistent with the strategy for investing. For example, the server 106 uses the contributed asset amount to invest in long-duration bonds that carry an interest rate above the incurred debt interest rate, and that have a duration that aligns with the length of the incurred debt (e.g., seven years).

Example Illustration of Pension Plan Funding

FIG. 3 is an exemplary illustration showing how a funding and investment strategy based on the techniques described herein results in substantial savings to the pension plan sponsor over a period of years. The top table 310 of FIG. 3 shows a typical funding strategy for a pension plan over a five-year glidepath, using cash contributions from the plan sponsor. The bottom table 320 of FIG. 3 shows a funding strategy using the techniques described herein, e.g., incurring corporate debt to fund the pension plan.

Table 310 shows how an annual pension contribution made by the plan sponsor reduces the funding deficit in the pension plan from $847 m to zero over a period of five years (i.e., the glidepath). Each year, the plan sponsor contributes the same amount, which is based on the current funding policy and expected annual return of asset allocation inside the pension plan. The contribution amount is calculated by taking an annual amoritization amount, adding or subtracting an amount of interest based on a discount interest rate at the time of contribution, and subtracting a tax savings amount that is realized because pension plan contributions are tax-deductible. For example, in years one through five, the contribution amount (also called the 'net cost to fund') is $105 m—as shown in the Net CF column in Table 310. Looking at year one, the contribution amount of $105 m is calculated by taking the annual amoritization amount of $202 m and subtracting $41 m in interest based on the then-current discount rate of −4.8%, resulting in an annual required contribution amount of $161 m. Then, the tax-deductible savings amount of $56 m is subtracted from the annual required contribution amount (i.e., $161 m×0.35 tax deduction percentage=$56 m savings) to result in a total cost to fund the plan of $105 m. Over the five-year glidepath set forth in Table 310, the plan sponsor's total contribution is $524 m, or $105 m per year.

Table 320 shows how implementing the techniques described herein—funding the future contributions now by incurring corporate debt—advantageously results in significant savings to the plan sponsor over the same five-year glidepath as presented in Table 310. An assumption for Table 320 is that the plan sponsor is required to contribute $161 m each year over the five-year period (the same amount used in Table 310). The present value of the future contributions is $725 m based on a 3.8% discount rate (the expected return inside the pension plan). Accounting for the 35% tax deduction savings on the contributed amount, the plan sponsor incurs $472 m of debt to fully fund the plan (see the Debt column in Table 320)—$472 m of debt issue plus $253 m of tax savings equals $725 m. It should be noted that Table 320 reflects a 1.3% interest rate on the incurred debt, in the Rate column. The plan sponsor contributes the $725 m into the pension plan.

The plan sponsor then invests the contributed $725 m inside the plan in a tax-free liability hedging portfolio (e.g., five-year bonds) that return 3.8% as mentioned previously. The plan sponsor services the incurred debt by making periodic principal (see Principal column in Table 320) and tax-deductible interest payments (see Interest column in Table 320)—resulting in an annual required debt service amount in the Total column of Table 320. However, because the interest payments are tax-deductible, a portion of those payments (i.e., 35%) is subtracted from the annual required debt service amount (see Taxes column in Table 320).

For example, in the first year the plan sponsor services the initial $472 m of debt by paying $87 m of principal and $6 m in interest (i.e., $472 m×1.3%), resulting in a total expenditure of $93 m. The plan sponsor can save $2 m due to the 35% tax deduction on the $6 m interest payment and thus the total cost to fund the plan for the first year is $91 m. When compared with the cash contribution glidepath shown in Table 310, the plan sponsor realizes a savings of $14 m ($105 m expenditure in Table 310 versus $91 m expenditure in Table 320).

Over the five-year glidepath, the plan sponsor can save approximately $40 m—$524 m net cost to fund in Table 310 versus $484 m net cost to fund in Table 320. The plan sponsor may be able to realize additional savings of up to 1.8% through reduction in PBGC risk premiums as described above. Therefore, the net cost to fund the plan each year using the techniques described herein, as reflected in Table 320, is significantly lower than the corresponding cost to fund the plan with cash contributions, as reflected in Table 310.

Figure 4:
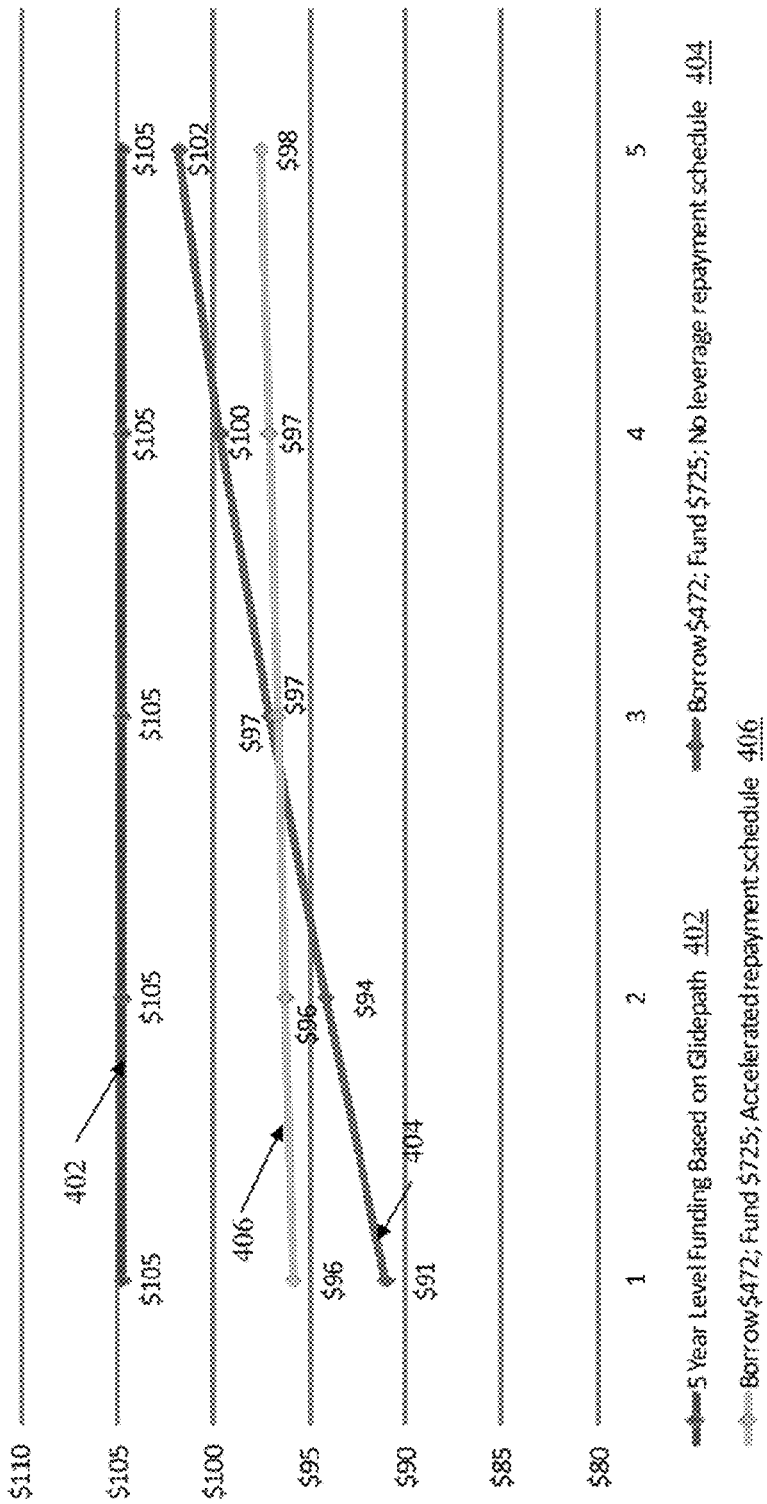
FIG. 4 is a chart showing comparative funding levels for five-year glidepaths using the data in FIG. 3.

FIG. 4 is a chart showing the comparative funding levels for the five-year glidepaths using the data in FIG. 3. The line 402 reflects the data in Table 310 and shows the annual after-tax funding cost for the annual cash contribution strategy. The line 404 reflects the data in Table 320 and shows the annual after-tax funding cost for a funding and investment strategy using the techniques described herein. In addition, the line 406 shows the annual after-tax funding cost for a funding and investment strategy using the techniques described herein—under an accelerated debt repayment schedule. An accelerated repayment schedule increases the funding cost in the first two years, but offers the advantage of reducing the amount of interest to be paid over the five-year glidepath while also reducing the funding cost in years four and five—resulting in a more evenly-distributed repayment schedule.

Figure 5:
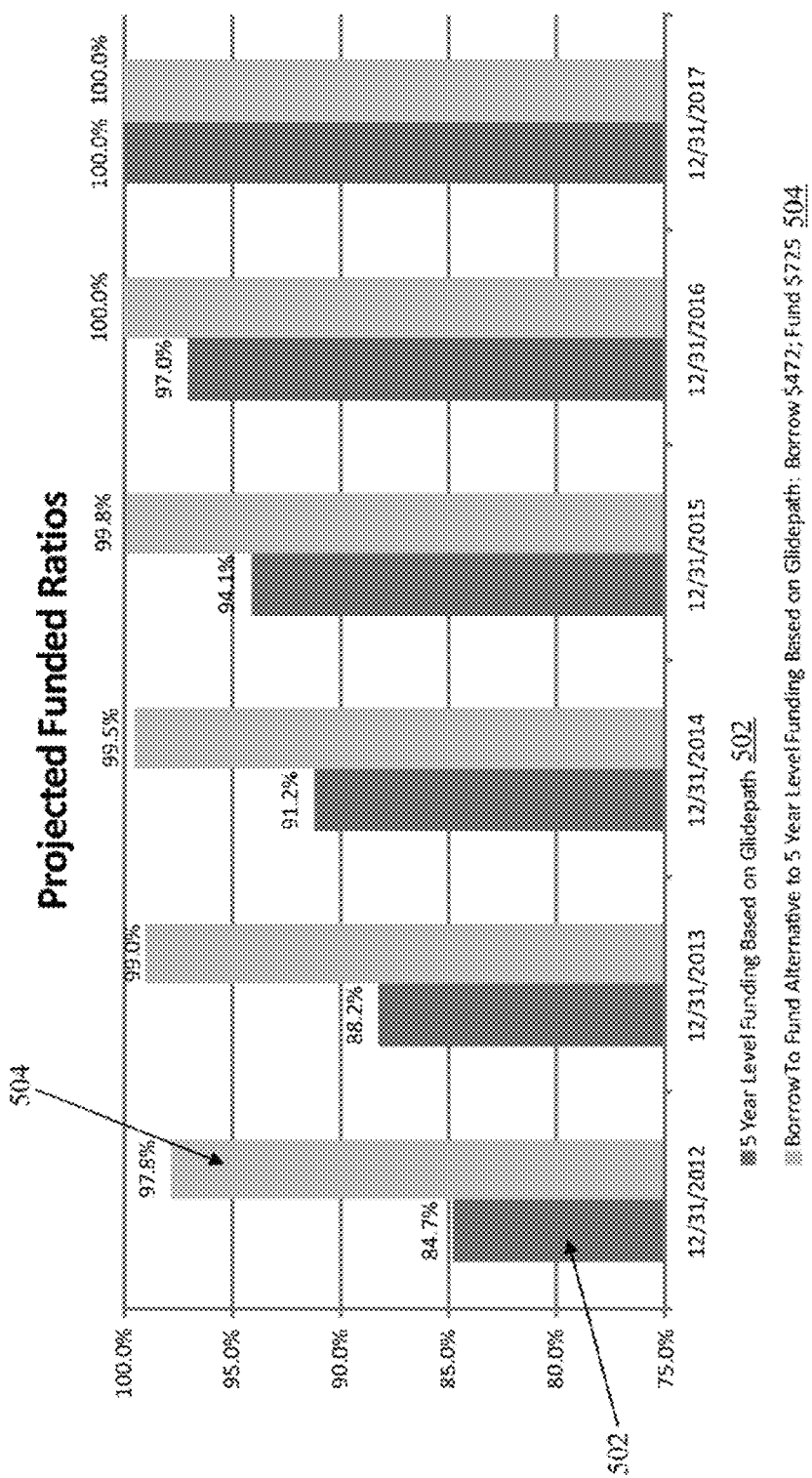
FIG. 5 is a chart showing comparative funding level percentages for five-year glidepaths using the data in FIG. 3.

FIG. 5 is a chart showing the comparative funding level percentages for the five-year glidepaths using the data in FIG. 3. The light gray bar on the left above each date (e.g., bar 502) reflects the funding level percentage (i.e., actual funding: full funding) for the data in Table 310—the funding and investment strategy using the annual cash contribution strategy, while the dark gray bar on the right above each date (e.g., bar 504) reflects the funding level percentage for the data in Table 320—the funding and investment strategy using the techniques described herein. As shown in FIG. 5, the annual cash contribution strategy results in a pension plan that is still significantly underfunded throughout the five-year glidepath. This can result in additional expenses due to PBGC risk premiums imposed by the government. Conversely, the funding and investment strategy using the techniques described herein results in a pension plan that is almost completely funded at the beginning of the glidepath and reaches a 100% funding level a year earlier than the cash contribution strategy.

Figure 6A:
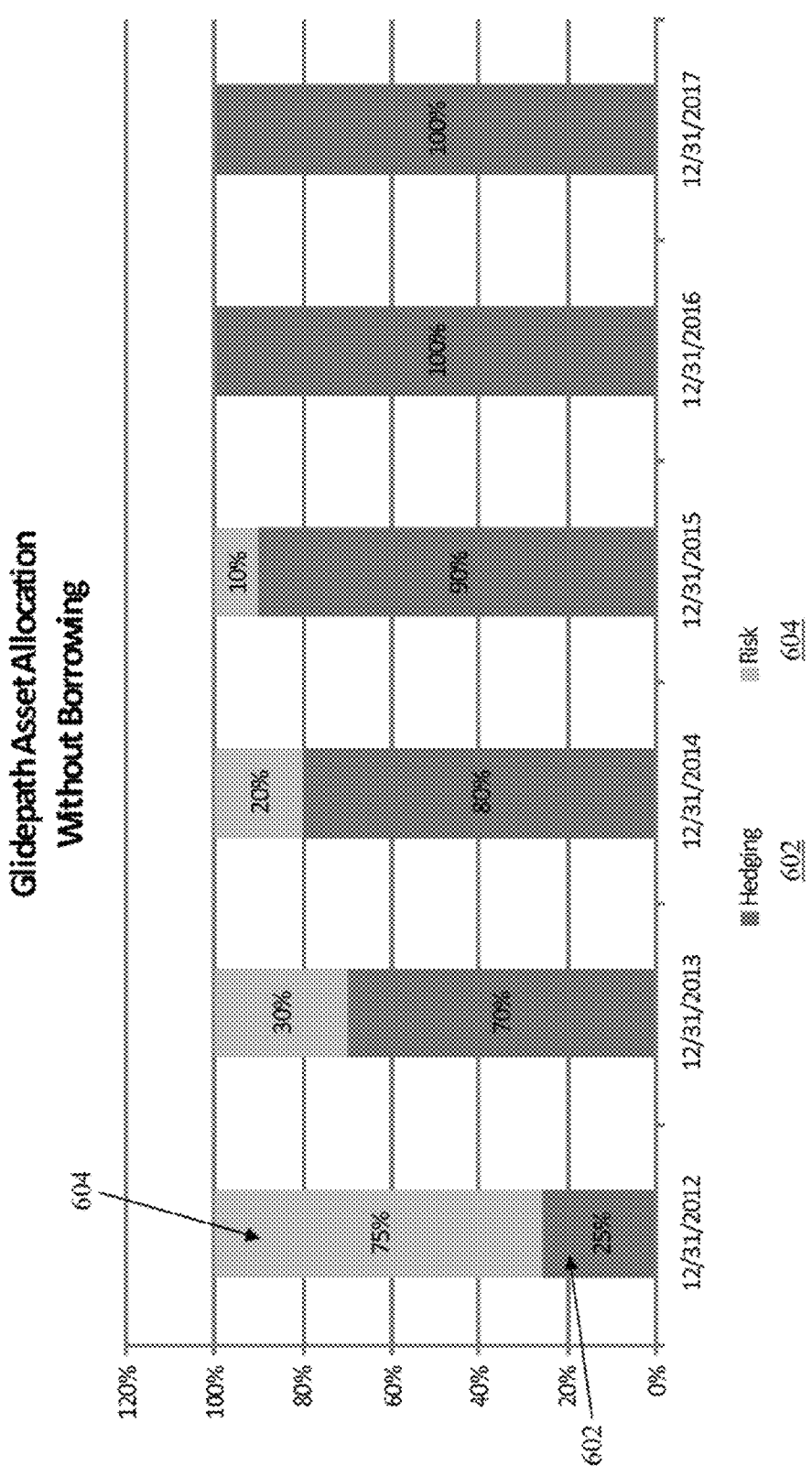
FIG. 6A is a chart showing asset allocation in the pension plan using the annual cash contribution strategy.

FIG. 6A is a chart showing the asset allocation in the pension plan using the annual cash contribution strategy, as reflected in Table 310 of FIG. 3. As shown in FIG. 6A, the dark gray portion of each bar (e.g., portion 602) represents the percentage of assets allocated to hedging assets (e.g., bonds, cash) while the light gray portion of each bar (e.g., portion 604) represents the percentage of assets allocated to risk assets (e.g., equities). For example, in the first year of the funding glidepath, the pension plan only has 25% of its assets invested in hedging assets and 75% of its assets invested in risk assets.

Figure 6B:
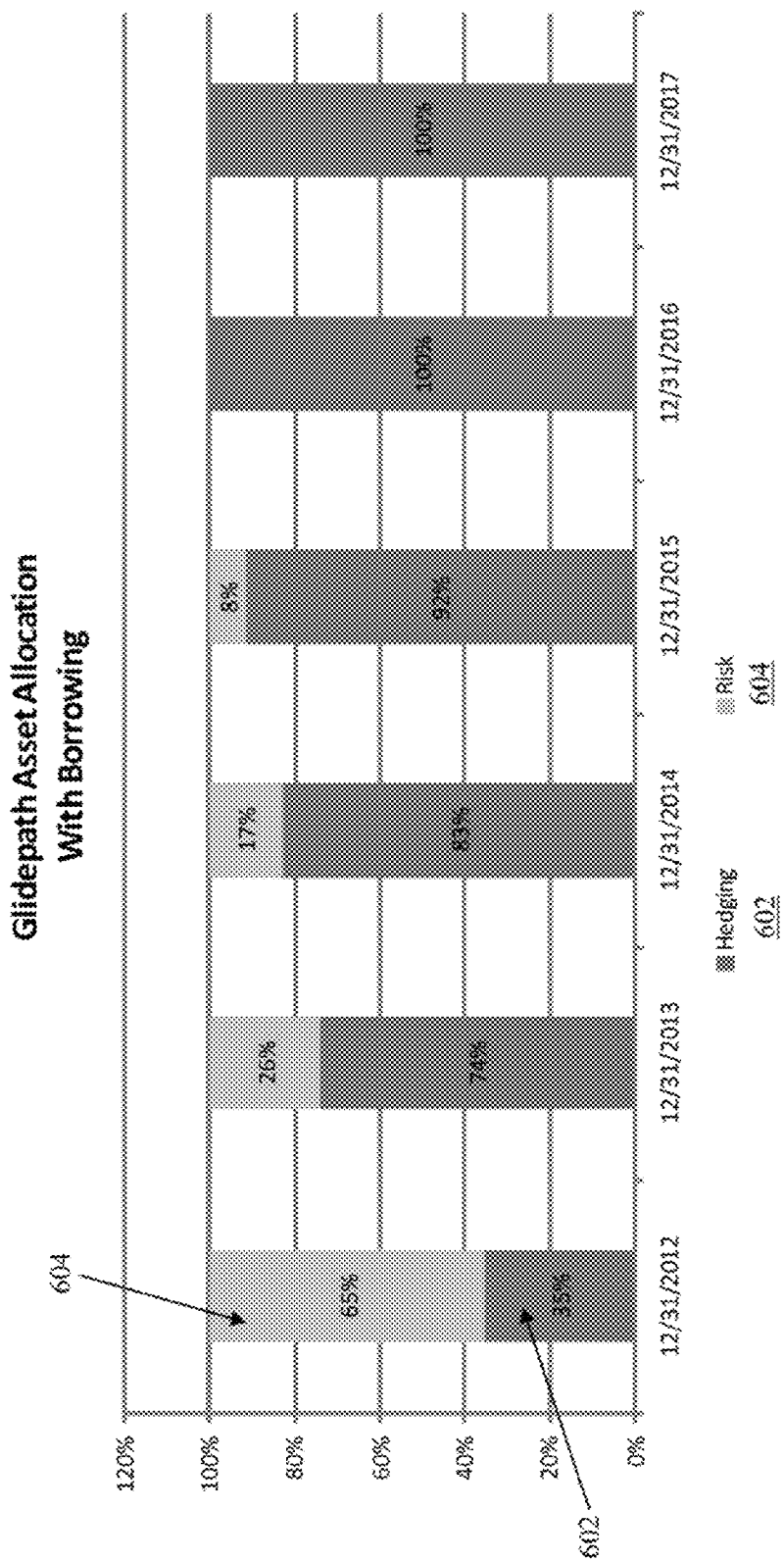
FIG. 6B is a chart showing asset allocation in the pension plan using a funding and investment strategy based on the techniques described herein.

FIG. 6B is a chart showing the asset allocation in the pension plan using the funding and investment strategy using the techniques described herein, as reflected in Table 320 of FIG. 3. As shown in FIG. 6B, the dark gray portion of each bar (e.g., portion 602) represents the percentage of assets allocated to hedging assets (e.g., bonds, cash) while the light gray portion of each bar (e.g., portion 604) represents the percentage of assets allocated to risk assets (e.g., equities). For example, in the first year of the funding glidepath, the pension plan has 35% of its assets invested in hedging assets and 65% of its assets invested in risk assets—which is a 10% increase in hedging assets when compared to the cash contribution strategy in FIG. 6A. Over the rest of the five-year glidepath, the funding and investment strategy using the techniques described herein provides for a significantly better ratio of hedging assets to risk assets—resulting in less risk of reduction in value of the pension plan assets.

Termination of Pension Plans

The techniques described herein also provides a way to determine if a plan sponsor should wait to fund a defined benefits plan. Plan sponsors with large funding shortfalls may feel that making discretionary contributions is tantamount to locking in their plan's underfunded status. By maintaining their pension fund's equity exposure and making only the minimum required contributions, they expect that excess investment returns (over liability returns) will reduce funding shortfalls and future plan funding costs. However, some combination of (a) contributions and (b) excess investment returns will be required to eliminate the funding shortfall. With respect to (a), there are cost advantages to making contributions sooner rather than later due to accelerated tax deductions and tax savings noted above, particularly in a low financing cost environment. Point (b) fails to take into consideration the risk to shareholder value (as discussed below) represented by the equity exposure—a transparent risk that will be priced into the company's share price and market valuation. And the more stringent seven year funding requirements under the Pension Protection Act of 2006 increase the likelihood that the incremental equity returns will fail to materialize soon enough to materially reduce plan funding costs.

In some embodiments, the plan sponsors may utilize the techniques presented herein to respond to the challenges of managing their pension plans by implementing pension risk management strategies such as Liability-Driven Investing (LDI). In environment of historically low interest rates and historically high capital market volatility, a plan termination option financed by corporate debt—the only form of LDI that completely eliminates both capital market and longevity risk—merits particular consideration as a strategy for increasing shareholder value by those among the large and also growing number of plan sponsors who have decided to freeze their pension plans.

Changes in funding regulations and accounting standards and capital market volatility mean greater funding volatility and reduced cash flow predictability. Beneficially, the techniques described herein enable a plan sponsor to determine that the plan termination option eliminates a major pension risk factor—the size of the plan relative to the plan sponsor. At the same time, in periods of low interest rates, the cost to finance a plan termination by issuing new debt is attractive for an investment grade issuer.

It can also be determined that pension plans have a negative impact on share price and shareholder value. Typically, the threat to shareholder value represented by pension risk is high, and is likely to remain elevated for some time.

The year 2012 marks the end of the transition period to more liberal rules for calculating minimum lump sum distributions, and more stringent minimum funding requirements for defined benefit plans. The methods and systems described herein take both of these developments into account and therefore is useful to determine if the plan termination option is the best choice, either by reducing the plan termination cost outright, or by increasing the cost to maintain the status quo, at least over the near term.

A question that may arise is "what impact would a plan termination have on shareholder value or, more specifically, the plan sponsor's share price and market capitalization?" In some cases, pension assets and liabilities do affect the market valuations of their plan sponsors. It has been determined that while each dollar increase in liabilities lowers the market value of the firm by about a dollar, an equal increase in pension assets raises the firm's market value by less than a dollar. A pension deficit reduces debt ratings by more than the same size pension surplus increases debt ratings. Thus, there may be strong possibility that a plan termination financed at a reasonable cost will increase shareholder value.

There is statistical and empirical evidence that pension plans have a negative impact on shareholder value. The major pension risk factor is the size of the plan relative to the plan sponsor. In some embodiments, the techniques provide for methods for plan sponsors who have decided to freeze their plans to carefully weigh the merits of plan termination. Terminating a plan may provide several benefits. For example, a plan termination completely eliminates several major risk factors including (1) the size of the plan relative to the plan sponsor; (2) longevity risk; (3) capital market risk; and (4) inflation risk associated with plan administrative costs and fees.

In many respects managing a frozen pension plan is similar to operating a subsidiary (most like an insurance company) that has no strategic value, is not a core business, and yet exposes the plan sponsor to significant risks. In a capital market environment that has evolved in the direction of greater transparency and a heightened awareness of risk, the techniques described herein determine if the potential rewards from disposing of this frequently unprofitable subsidiary outweighs the potential costs.

In terms of its impact on shareholder value, the size of the pension plan relative to the plan sponsor—measured by the Projected Benefit Obligation (PBO) divided by the market capitalization of the plan sponsor—is a major risk factor. Measured on this basis, pension risk is at an all time high as a consequence of the sharp decline in equities between 4Q 2007 and 1Q 2009, and interest rates which continue to hover near record lows. And, for the near term at least, there is scant evidence that pension risk will decline significantly. In the meantime, some plan sponsors with frozen plans may be surprised to see their pension liabilities continue to grow since, in many cases, the interest costs accruing on their liabilities will exceed the value of plan benefit payments. Making matters worse are record high levels of capital market volatility that create uncertainty over the impact of pension plans on top line financial results, and a sluggish U.S. economy that puts added pressure on operating company performance and market valuations.

In some implementations, plan sponsors can implement LDI strategies to manage pension risk. Some form of LDI for the majority of plan sponsors is advantageous. However, the techniques described herein show that the plan termination option merits particular consideration by plan sponsors who have decided to freeze their pension plans for a number of key reasons:

From the perspective of shareholder value, maintaining and managing an LDI strategy for a plan that has little, if any, strategic value for the plan sponsor is, on a risk-adjusted basis, a zero sum game at best.

Over the long term, longevity risk may prove to be a greater risk than capital market risk. Most forms of LDI do not address this risk, while the plan termination option eliminates it completely.

The size of the plan relative to the plan sponsor is a major pension risk factor. How much impact LDI will have on this risk factor has yet to be determined. The plan termination option eliminates it completely.

Most of the costs of running a defined benefit plan continue even after the plan is frozen. Overall plan costs can be as much as 1% to 3% of plan assets. They include:
1. Investment management fees
2. Actuarial fees
3. Audit and accounting fees
4. Legal fees
5. Trustee and custodial fees
6. Fiduciary insurance premiums
7. PBGC premiums
8. Staffing, overhead and out-of-pocket costs Here, there are two issues to consider, including (1) the cost to finance the contributions that will be required to fund the plan up to the plan termination liability and (2) the plan termination liability relative to the true economic cost of the plan.

Since the pricing of a close-out annuity contract will reflect the tax favored status of the pension plan, all of the cost savings and tax benefits that result when pension contributions are financed by low cost debt apply as well when those contributions fund a plan termination.

In some instances, the plan termination liability, or the cost to purchase a closeout annuity contract, varies between 110% and 120% of the plan's accounting liability measured on an Accumulated Benefit Obligation (ABO) basis. This wide variation in cost estimates reflects the prevailing wide variations in the complexity of individual plans, as well as wide variations in the demographics of participants covered by these plans.

There is a problem with these estimates, however, in that the accounting liability may not be a reliable estimate of the liability for several reasons.

The longevity assumption used to calculate the accounting liability may not adequately reflect future mortality improvements. (On this point, there in no clear agreement regarding the level of future mortality improvement).

The pricing of the liability cash flows is based on a hypothetical AA corporate bond yield curve. In reality, it is unlikely that a portfolio of AA rated bonds that is cash flow matched with plan liability cash flows will be adequate to meet the plan's needs over the long term, due to the likelihood of defaults among issues within such a portfolio over the life of the plan.

With some plan sponsors, the likelihood of such an occurrence may reinforced by a tendency to select AA issues with higher yields as a guide for pricing pension liabilities.

The accounting liability may not include adequate provision for the significant costs associated with maintaining and managing a plan. (This adjustment alone could easily add 5% to the accounting liability).

On the other hand, the pricing of a close-out annuity may reflect the insurance company's charges for longevity and investment risks, plan administration expenses, and profit. Accordingly, the reference point for evaluating the cost of a close-out annuity should be a restated accounting liability that (1) is based on an unbiased discount rate that makes adequate provision for default risk; (2) makes adequate provision for future longevity improvement; and (3) includes the present value of future plan administration costs.

As noted above, 2012 marks the end of the transition to new more liberal rules for calculating minimum lump sum distributions under the PPA. As a consequence, plan termination costs may be significantly reduced from the levels noted above by extending to active employees an offer of a lump sum distribution as an alternative to a paid-up annuity contract. Lump sums are generally less expensive than annuities, especially for active employees. By some estimates, including a lump sum option may reduce plan termination costs to as low as 5% over the accounting liability depending upon the plan population demographics and the utilization rate of the lump sum option.

Exemplary Termination Analysis

Figure 7:
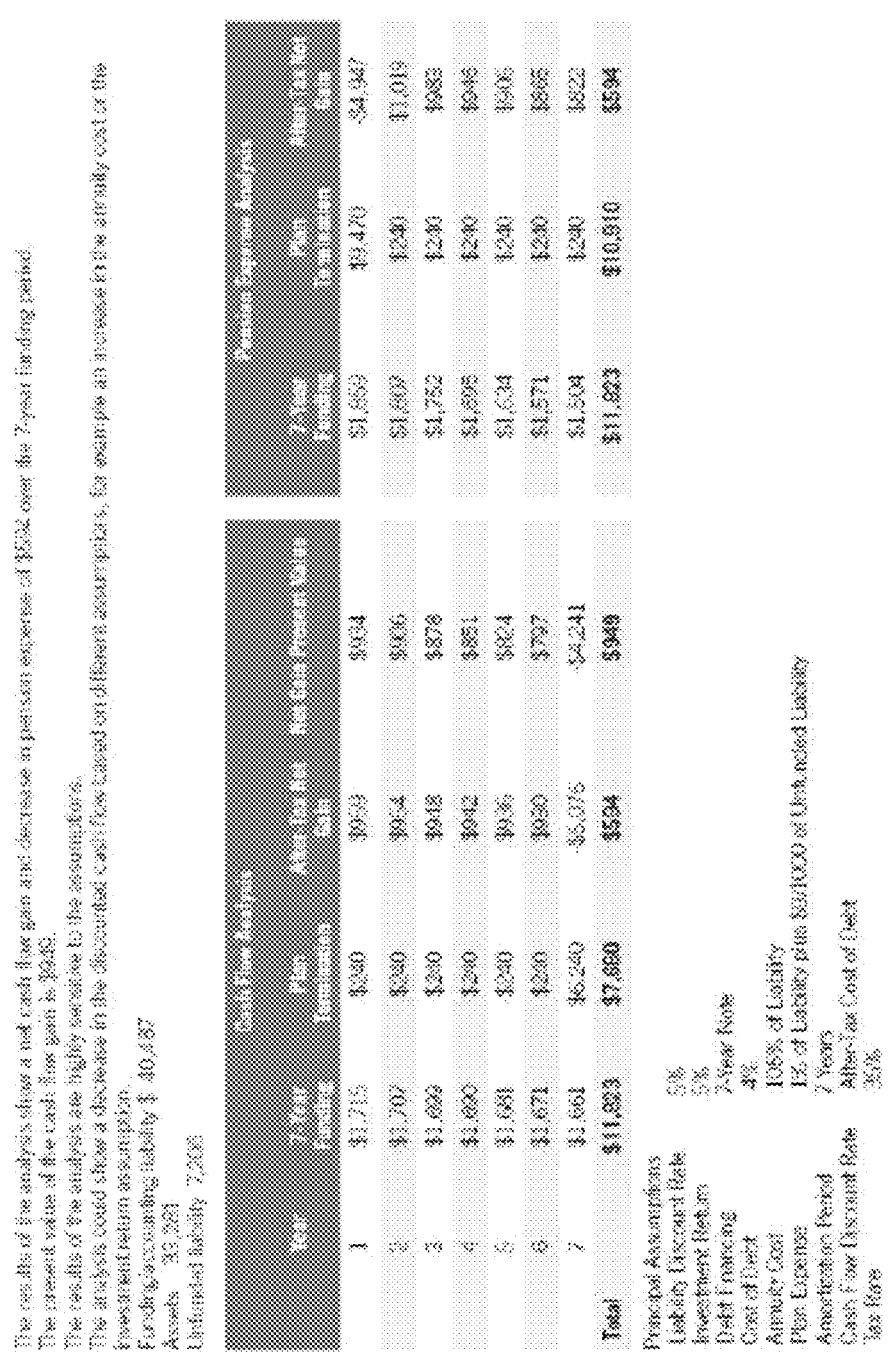

FIG. 7 is an exemplary plan termination illustration. FIG. 7 shows a net cash flow gain and decrease in pension expense of $594 over the 7-year funding period.

In FIG. 7, the present value of the cash flow gain is $949 and the results of the analysis are highly sensitive to the assumptions. The analysis could show a decrease in the discounted cash flow based on different assumptions, for example an increase in the annuity cost or the investment return assumption. Funding/accounting liability is $40,487, assets are $33,281, and unfunded liability is $7,206. Some of the principal assumptions are:

Liability Discount Rate: 5%
Investment Return: 5%
Debt Financing: 7-Year Note
Cost of Debt: 4%
Annuity Cost: 105% of Liability
Plan Expense: 1% of Liability plus $9/1000 of Unfunded Liability
Amortization Period: 7 Years
Cash Flow Discount Rate: After-Tax Cost of Debt
Tax Rate: 35%

When considering the points above, the cost of a plan termination, including lump sum distributions and annuities, may not be significantly higher than a realistic estimate of the plan's economic liability, especially if lump sums represent a large part of plan termination costs.

For plan sponsors who have frozen and decided to de-risk their defined benefit plans, ongoing pension costs and liabilities can still be substantial. Furthermore, designing, implementing, and managing an effective LDI strategy is a time consuming and challenging task. For most senior management teams, running a successful core business is challenging enough. They do not need the distraction, if not the headache, of managing a pension plan that, in many cases, has a substantial impact on top line financial results but little, if any, strategic value. Plan sponsors who find themselves in this position should consider risk transfer rather than risk management. For plan with frozen defined benefit plans, the case for a plan termination is particularly compelling at the present time:

Only a plan termination eliminates a major eliminates a major pension risk factor—the size of the plan relative to the company.

A plan termination eliminates a potentially significant source of income statement, balance sheet, and cash flow volatility.

Only a plan termination eliminates longevity risk—a potentially significant long term pension risk.

A plan termination substantially reduces the plan sponsor's fiduciary obligations.

Seldom have the financial economics of a plan termination been more attractive due to (1) more liberal lump sum distribution rules; (2) record low interest rates; (3) significant tax benefits of a debt financed plan termination; and (4) significant plan administration and management cost savings.

Figure 8:
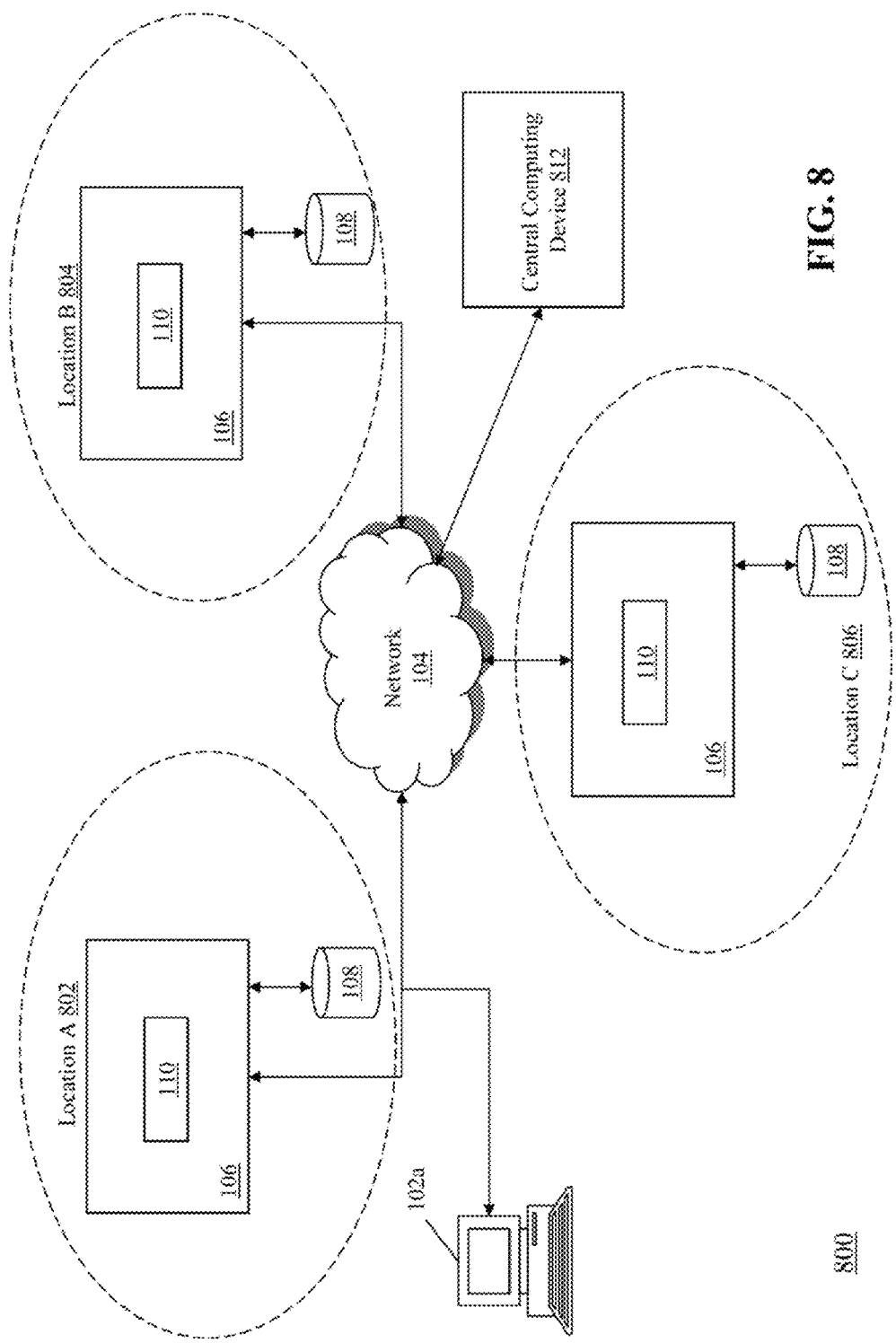
FIG. 8 is a block diagram of a networked system comprising multiple computing devices distributed across different locations.

The techniques may be implemented in a networked system 800 comprising multiple computing devices distributed across different locations, as shown in FIG. 8. Each of Location A 802, Location B 804 and Location C 806 includes the server computing device 106 having components 108, 110 of FIG. 1, and the servers at locations 802, 804, and 806 are connected to each other via the network 104. The networked system of FIG. 8 enables distribution of the processing functions described herein across several computing devices and provides redundancy in the event that a computing device at one location is offline or inoperable. In some embodiments, client computing devices (e.g., device 102*a*) in proximity to a particular location (e.g., Location A 802) access the networked system via the server 106 at that location. In some embodiments, the server computing devices 106 at the respective locations 802, 804, 806 communicate with a central computing device 812 (e.g., a server) that is coupled to the network. The central computing device 812 can provide data and/or processing resources for the network of computing devices 106 (e.g., synchronization of functionality/data across the computing devices).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A computerized method for generating a funding and investment strategy associated with an underfunded pension plan, the method comprising:

determining, by a computing device, an amount of funding required to fund an underfunded pension plan to a predetermined liability limit, wherein the amount of funding required is adjusted for (i) an expected return on pension plan assets, (ii) governmental premiums imposed on underfunded pension plans, and (iii) tax deduction amounts;

determining, by the computing device, periodic future non-debt-based contribution amounts for the pension plan;

adjusting, by the computing device, the amount of funding required based on the future non-debt-based contribution amounts;

determining, by the computing device, an amount of debt to incur based on the adjusted amount of funding required;

contributing, by the computing device, the incurred debt amount into the pension plan as a pension plan asset;

generating, by the computing device, a strategic plan for investing the contributed pension plan asset in long-duration bonds, wherein the long-duration bonds have a higher yield curve than the incurred debt interest rate;

acquiring, by the computing device, long-duration bonds that have characteristics consistent with the strategic plan; and during a subsequent period, adjusting, by the computing device, the future non-debt-based contribution amount so that the funding level of the pension plan meets but does not exceed the predetermined liability limit.

2. The method of claim 1, further comprising:

determining, by the computing device, a tax savings amount based on the incurred debt interest rate; and adjusting, by the computing device, the amount of debt to incur based on the tax savings amount.

3. The method of claim 2, wherein the tax savings amount is based on a tax deduction on interest accrued under the incurred debt interest rate.

4. The method of claim 2, wherein the tax savings amount is based on an investment return earned on the contributed pension plan asset.

5. The method of claim 1, wherein the duration of the long-duration bonds is equal to a government-imposed funding period.

6. The method of claim 1, wherein the governmental premiums imposed on underfunded pension plans include Pension Benefit Guaranty Corporation (PBGC) premiums.

7. The method of claim 1, wherein the long-duration bonds have a higher interest rate than the incurred debt interest rate.

8. The method of claim 1, wherein the characteristics consistent with the strategic plan include an interest rate and a duration.

9. The method of claim 1, wherein the incurred debt is in the form of a corporate debt offering.

10. A system for generating a funding and investment strategy associated with an underfunded pension plan, the system including a computing device with a processor configured to:

determine an amount of funding required to fund an underfunded pension plan to a predetermined liability limit, wherein the amount of funding required is adjusted for (i) an expected return on pension plan assets, (ii) governmental premiums imposed on underfunded pension plans, and (iii) tax deduction amounts;

determine periodic future non-debt-based contribution amounts for the pension plan;

adjust the amount of funding required based on the future non-debt-based contribution amounts;

determine an amount of debt to incur based on the adjusted amount of funding required;

contribute the incurred debt amount into the pension plan as a pension plan asset;

generate a strategic plan for investing the contributed pension plan asset in long-duration bonds, wherein the long-duration bonds have a higher yield curve than the incurred debt interest rate;

acquire long-duration bonds that have characteristics consistent with the strategic plan; and during a subsequent period, adjust the future non-debt-based contribution amount so that the funding level of the pension plan meets but does not exceed the predetermined liability limit.

11. The system of claim 10, wherein the processor is further configured to:

determine a tax savings amount based on the incurred debt interest rate; and adjust the amount of debt to incur based on the tax savings amount.

12. The system of claim 11, wherein the tax savings amount is based on a tax deduction on interest accrued under the incurred debt interest rate.

13. The system of claim 11, wherein the tax savings amount is based on an investment return earned on the contributed pension plan asset.

14. The system of claim 10, wherein the duration of the long-duration bonds is equal to a government-imposed funding period.

15. The system of claim 10, wherein the governmental premiums imposed on underfunded pension plans include Pension Benefit Guaranty Corporation (PBGC) premiums.

16. The system of claim 10, wherein the long-duration bonds have a higher interest rate than the incurred debt interest rate.

17. The system of claim 10, wherein the characteristics consistent with the strategic plan include an interest rate and a duration.

18. The system of claim 10, wherein the incurred debt is in the form of a corporate debt offering.

19. A computer program product, tangibly embodied in a non-transitory computer readable storage medium, for generating a funding and investment strategy associated with an underfunded pension plan, the computer program product including instructions operable to cause a computing device to:

determine an amount of funding required to fund an underfunded pension plan to a predetermined liability limit, wherein the amount of funding required is adjusted for (i) an expected return on pension plan assets, (ii) governmental premiums imposed on underfunded pension plans, and (iii) tax deduction amounts;

determine periodic future non-debt-based contribution amounts for the pension plan;

adjust the amount of funding required based on the future non-debt-based contribution amounts;

determine an amount of debt to incur based on the adjusted amount of funding required;

contribute the incurred debt amount into the pension plan as a pension plan asset;

generate a strategic plan for investing the contributed pension plan asset in long-duration bonds, wherein the long-duration bonds have a higher yield curve than the incurred debt interest rate;

acquire long-duration bonds that have characteristics consistent with the strategic plan; and during a subsequent period, adjust the future non-debt-based contribution amount so that the funding level of the pension plan meets but does not exceed the predetermined liability limit.

20. The method of claim 1, wherein the duration of the long-duration bonds is greater than a government-imposed funding period.

21. The method of claim 1, further comprising determining, by the computing device, whether to terminate the pension plan based upon the amount of funding required.

22. The method of claim 1, further comprising determining, by the computing device, whether to terminate the pension plan based upon the strategic plan.

23. The method of claim 1, further comprising determining, by the computing device, whether to freeze the pension plan based upon the amount of funding required.

24. The method of claim 1, further comprising determining, by the computing device, whether to freeze the pension plan based upon the strategic plan.

* * * * *